US008166526B2

(12) United States Patent
Gavrilos et al.

(10) Patent No.: US 8,166,526 B2
(45) Date of Patent: Apr. 24, 2012

(54) SYSTEM AND METHOD FOR PROVIDING SECURE ACCESS TO PASSWORD-PROTECTED RESOURCES

(75) Inventors: Nick E Gavrilos, Chicago, IL (US); William S Hede, Lake in the Hills, IL (US)

(73) Assignee: Motorola Mobility, Inc., Libertyville, IL (US)

(*) Notice: Subject to any disclaimer, the term of this patent is extended or adjusted under 35 U.S.C. 154(b) by 779 days.

(21) Appl. No.: 12/345,070

(22) Filed: Dec. 29, 2008

(65) Prior Publication Data

US 2010/0169959 A1 Jul. 1, 2010

(51) Int. Cl.
*G06F 21/00* (2006.01)
(52) U.S. Cl. ............................................. 726/5; 726/21
(58) Field of Classification Search .................. 726/2–7, 726/21, 26–28; 713/182, 183
See application file for complete search history.

(56) References Cited

U.S. PATENT DOCUMENTS

| | | | |
|---|---|---|---|
| 5,499,288 A | 3/1996 | Hunt et al. | |
| 6,226,383 B1 | 5/2001 | Jablon | |
| 6,980,081 B2 * | 12/2005 | Anderson | 340/5.53 |
| 6,990,586 B1 | 1/2006 | Tresser et al. | |
| 2002/0083347 A1 | 6/2002 | Taguchi | |
| 2003/0093699 A1 | 5/2003 | Banning et al. | |
| 2004/0030934 A1 * | 2/2004 | Mizoguchi et al. | 713/202 |
| 2004/0147265 A1 | 7/2004 | Kelley et al. | |
| 2004/0186725 A1 | 9/2004 | Maruyama | |
| 2005/0010768 A1 | 1/2005 | Light et al. | |
| 2005/0071637 A1 | 3/2005 | Shirakawa | |
| 2005/0246764 A1 | 11/2005 | Debrito | |
| 2008/0052245 A1 | 2/2008 | Love | |
| 2008/0141345 A1 | 6/2008 | Gavrilos et al. | |
| 2008/0301791 A1 * | 12/2008 | Smith et al. | 726/7 |

OTHER PUBLICATIONS

PCT Notification of Transmittal of the International Search Report and the Written Opinion of the International Searching Authority, or the Declaration, Jul. 8, 2010, pp. 1-9, PCT/US2009/066583, Korean Intellectual Property Office.

* cited by examiner

*Primary Examiner* — Gilberto Barron, Jr.
*Assistant Examiner* — Abdulhakim Nobahar

(57) ABSTRACT

A method of a wireless communication device for accessing secure resources of a resource provider or the device itself. A password associated with the wireless communication device is identified. A password identifier is assigned to the password and a non-password identifier is assigned to a non-password different from the password. The password identifier has a non-sequential association with the non-password identifier. The password identifier, the password, the non-password identifier, and the non-password are provided at a user interface of the wireless communication device. Access to a secure resource is granted in response to determining that the password identifier has been detected at the user interface.

12 Claims, 3 Drawing Sheets

SYSTEM AND METHOD FOR PROVIDING SECURE ACCESS TO PASSWORD-PROTECTED RESOURCES

FIELD OF THE INVENTION

The present invention relates generally to the field of communication systems that provide access to password-protected applications to remote terminals. More particularly, the present invention is directed to a system that permits a remote terminal to access one or more applications of a network server via a communication network upon receiving appropriate password information from the remote terminal.

BACKGROUND OF THE INVENTION

Various resources, including products, services and information, may be accessed by the general public via voice or data communications. For example, a person may make a voice call to a customer service department of a financial institution and request financial services over the phone. As another example, computing devices, such as desktop and laptop computers networked with a financial institution, may be used to access online services of the financial institution. In this manner, financial transactions may be conducted over a voice line or data network to allow customers to accomplish many tasks, such as doing their banking outside of bank hours and from anywhere where network access is available.

Whether resources are accessed via voice or data communication, many resource providers implement some type of security procedure to protect the product, services and information in their possession. A popular security procedure utilized by many service providers is to require people who attempt to access their resources to convey a specific, predetermined password. A password is a form of secret authentication data that is used to control access to a resource of the resource provider. The password is kept secret from those not allowed access, and those wishing to gain access are tested on whether or not they know the password and are granted or denied access accordingly.

Even when a password is utilized, fraudulent individuals and groups are able to "steal" the password of select victims and gain access to resources intended for the victims without proper authorization. For example, a fraudulent individual may look over the shoulder of a user and observe the user's visual/mechanical interaction with a user interface of his or her device in order to reconstruct the user's password. Also, the fraudulent individual may overhear the user's audio interaction with the user interface. Users of wireless communication devices are particularly susceptible to such fraudulent crimes, since wireless communication devices may be used almost anywhere, thus providing fraudulent individuals with many opportunities to observe and/or overhear the user's interaction with his or her user interface.

There is a need for a wireless communication device of a user that minimizes the opportunities for others to steal or otherwise gain unauthorized access to resources of a resource provider intended for the user. In particular, the wireless communication device should provide a way for the user to identify his or her password to the resource provider with minimal interaction with the user interface of the device, thus minimizing the opportunities for others to observe and/or overhear the user's interaction with his or her device.

DETAILED DESCRIPTION OF THE EMBODIMENTS

Figure 1:
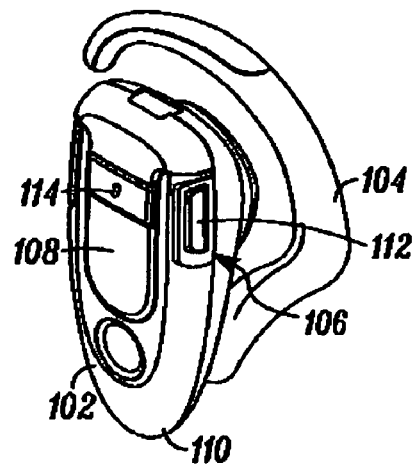
FIG. 1 is a perspective view of an exemplary embodiment in accordance with the present invention.

In accordance with the present invention, there is described herein a wireless communication device for a user that minimizes opportunities for others to determine the user's password for accessing resources of a resource provider or the device itself based on the user's interaction with the device. In particular, the wireless communication device provides a way for the user to identify his or her password to the resource provider or its internal components without providing the actual password to the user interface of the device. Instead, the wireless communication device presents a selection process, similar to a multiple-choice question format, in which the actual password choice is intermingled with incorrect answer choices.

One aspect of the present invention is a method of a wireless communication device for accessing secure resources. Initially, a password associated with the wireless communication device is identified. Next, a password identifier is assigned to the password and a non-password identifier is assigned to a non-password different from the password. The password identifier has a non-sequential association with the non-password identifier. The password identifier, the password, the non-password identifier, and the non-password are then provided at a user interface of the wireless communication device. Thereafter, a user input is detected at the user interface. Finally, access to a secure resource is granted in response to determining that the password identifier has been detected at the user interface.

For another aspect of the present invention, a password associated with the wireless communication device is identified, in which the password includes a first password portion and a second password portion. A first password identifier is assigned to the first password portion and a first non-password identifier is assigned to a first non-password portion different from the first password portion. The first password identifier, the first password portion, the first non-password identifier, and the first non-password portion are provided at a user interface of the wireless communication device. A first user input is detected at the user interface. A second password identifier is assigned to the second password portion and a second non-password identifier is assigned to a second non-password portion different from the second password portion. The second password identifier, the second password portion, the second non-password identifier, and the second non-password portion are provided at the user interface. A second user input is detected at the user interface. Access to a secure resource is granted in response to determining that the first and second password identifiers have been detected at the user interface.

Many communication devices may benefit from the secure manner in which a password may be conveyed by a user to the devices in accordance with the present invention. Examples of the devices that may benefit include mobile communication devices, which may be used at a wide variety of locations in a many different circumstances, thus making them susceptible to security breaches. Although there are various ways to make a communication device mobile, of particular interest are wireless communication devices that includes wireless communication capabilities and portable power sources. Wireless communication capabilities include, but are not limited to, wireless links that utilized one or more communication protocols, such as TDMA (including GSM), CDMA, UMTS, CDMA 2000, IEEE 802.16, and other related protocols. Wireless communication capabilities further include, but are not limited to, wireless links that utilized one or more peer-to-peer or ad hoc protocols, such as HomeRF, Bluetooth, IEEE 802.11 (a, b, g, or n), and the like. It is also conceivable to apply the concepts herein to other forms of wireless communication such as infrared technology or proprietary RF technology. It is to be understood that the secure manner for password conveyance describer herein may be applied to a single integrated device or more than one cooperative devices working together.

Referring to FIG. 1, an exemplary wireless communication device 100 is illustrated. Although the secure manner for password conveyance in accordance with the present invention may be applied to a wide variety of communication devices, it is recognized that devices having certain capabilities and/or form factors may particularly benefit from this feature. The communication device 100 shown in FIG. 1 is an ear-mountable device having a device body 102 and an ear hook 104 attached to one side of the device body. When the ear hook 104 is positioned, and supported by, an upper portion of a user's ear, the communication device 100 is positioned against the side of the user's head such that an earpiece 106 of the communication device is positioned adjacent to the user's ear. In addition to the audio output from the earpiece 106, a user interface of the communication device 100 may include components for providing other forms of output, such a display 108 for providing visual output and an internal vibrating mechanism (not shown) for providing mechanical output. The user interface of the communication device 100 may further include input components, such as a mouthpiece 110 directed to the user's mouth for receiving audio input and one or more selection buttons 112, 114 for receiving mechanical input.

An ear-mountable device 100 generally includes audio input and output components, such as the earpiece 106 and the mouthpiece 110, since positioning of these components near the user's ear is considered to be quite convenient. However, due to the small form factor of the ear-mountable device 100, other parts of the user interface may be more difficult to implement on the ear-mountable device 100 due to the limited available surfaces and internal space available for the device. For example, many ear-mountable devices 100 do not include any type of display due to the surface/space limitations as well as the inability of the user to view the display while the device is mounted to the user's ear. Other devices, such as the device 100 shown in FIG. 1, may include a display 108, but the dimensions of the display is typically smaller than the dimensions of other types of communication devices, such as radio handsets and wireless personal digital assistants. Likewise, ear-mounted devices 100 may include selection buttons 112, 114, but the quantity of buttons provided by the devices are typically less than the quantity of buttons provided by other communication devices. Accordingly, for each ear-mountable device 100, it is desirable to maximize usage of the audio input and output components for the various functions of the device.

Figure 2:
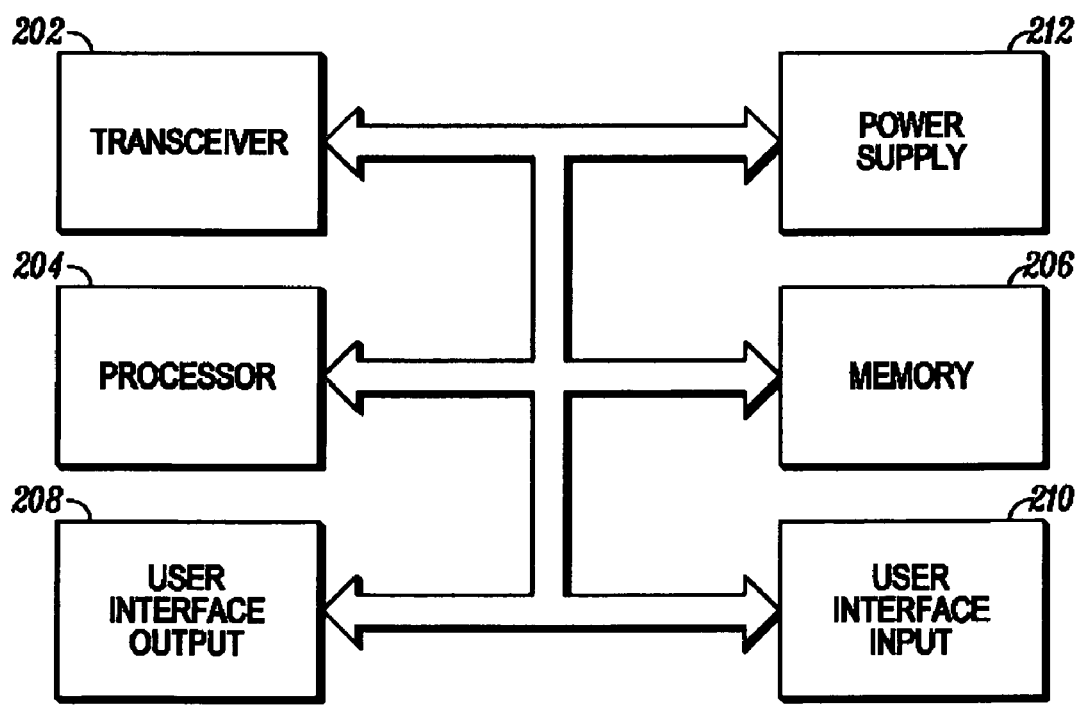
FIG. 2 is a block diagram illustrating exemplary internal components of the embodiment of FIG. 1.

Referring to FIG. 2, there is provided a block diagram illustrating exemplary internal components 200 of a wireless communication device, such as wireless communication device 100 of FIG. 1, in accordance with the present invention. The exemplary embodiment includes one or more wireless transceivers 202, a processor 204, a memory portion 206, one or more user interface ("UI") output components 208, and one or more UI input components 210. Each transceiver 202 may utilize wireless technology for communication, such as the wireless communication capabilities described above. The internal components 200 may further include a power supply 212, such as a battery, for providing power to the other internal components while enabling the wireless communication device 100 to be portably mobile.

The input and output components 208, 210 of the internal components 200 may include a variety of visual, audio and/or mechanical outputs, similar to the input and output components represented by FIG. 1. For example, the output component(s) 208 may include a visual output component such as a liquid crystal display and light emitting diode indicator, an audio output component such as a speaker, alarm and/or buzzer, and/or a mechanical output component such as a vibrating mechanism. Likewise, by example, the input components 210 may include a visual input component such as an optical sensor (for example, a camera), an audio input component such as a microphone, and a mechanical input component such as a flip sensor, keyboard, keypad, selection button, touch pad, touch screen, capacitive sensor, motion sensor, and switch. Actions that may actuate one or more input components 210 include, but not limited to, orienting different housings of the wireless communication device (such as the body 102 and the ear hook 104), unlocking the device, moving the device to actuate a motion, moving the device to actuate a location positioning system, and operating the device.

The memory portion 206 of the internal components 200 may be used by the processor 204 to store and retrieve data. The data that may be stored by the memory portion 206 include, but is not limited to, operating systems, applications, and data. Each operating system includes executable code that controls basic functions of the communication device, such as interaction among the components of the internal components 200, communication with external devices via the transceiver 202 and/or the component interface 212, and storage and retrieval of applications and data to and from the memory portion 206. Each application includes executable code utilizes an operating system to provide more specific functionality for the communication device, such an application for executing the secure manner for password conveyance described herein. Data is non-executable code or information that may be referenced and/or manipulated by an operating system or application for performing functions of the communication device. For the secure manner for password conveyance by the wireless communication device 100, the requisite password, and/or portions thereof, may be stored in the memory portion 206 as part of the executable application or as separate data accessible by the executable application.

Figure 3:
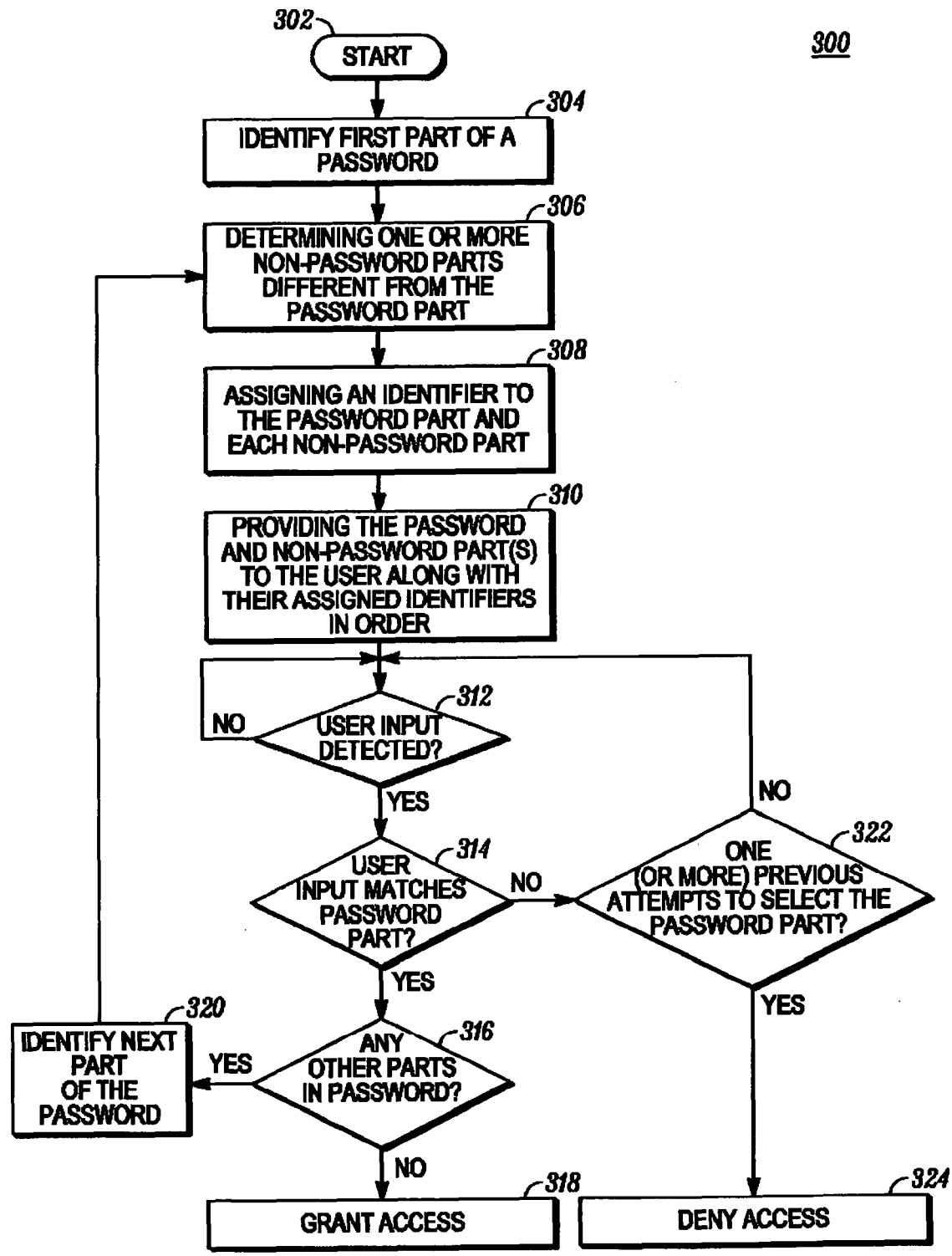
FIG. 3 is a flow diagram representing an exemplary operation of the embodiment of FIG. 1.

Referring to FIG. 3, there is provided a flow diagram representing a partitioned password process 300 in accordance with the present invention. Starting at step 302, a first part of a password must be identified at step 304. Regardless of how the password is determined, two or more parts of the password must be identified and stored in the memory portion 206 of the wireless communication device 100. For example, the password may be provided to the wireless communication device 100 at one or more UI input components 210 or from another device, directly or via communication infrastructure, at the transceiver 202. For one embodiment, the wireless communication device 100 may receive the password at a UI input component 210 and/or the transceiver 202, the processor 204 may parse the password into two or more parts based on a predetermined criteria, and store the parts in the memory portion 206. Examples of the predetermined criteria include, but are not limited to, a particular quantity of digits, characters or symbols per part. For example, a six character password may be subdivided into six parts having one character each. For another embodiment, the wireless communication device 100 may receive two or more parts at a UI input component 210 and/or the transceiver 202, and store the parts in the memory portion 206. The first part of the password is identified by selecting one of the parts based on a predetermined rule. For example, the first part of the password may be identified as the left-most or right-most part of the password.

After identifying the first part of the password, one or more other parts, i.e. at least one non-password part, different from the selected part of the password are determined at step 306. The non-password parts may be predetermined, generated randomly or generated semi-randomly (based on one or more rules). It is preferable that these non-password parts are similar to, but must be different from, the selected password part in format. Similarities may include parts forming similar word completions, such as "back", "for" and "to" for completing "ward" for backward, forward and toward. Similarities may further include, but are not limited to, the length of the part, the appearance of the part, the sound of the part, and characters having locations adjacent to the characters represented by the part on a keypad, keyboard or predetermined character order. For one example, if the password is the word "password" and each part is character of the password, namely "p", "a", "s", "s", "w", "o", "r" and "d", then the partitioned password process 300 selects the first character "p" at step 304 and generates non-password parts similar to "p", such as "b", "1" and "q", at step 306.

Each password part and non-password part may be assigned an identifier at step 308. The identifiers assigned to the parts are random and do not have any type of sequential order associated with them, such as non-alphabetical order, non-numerical order, non-coded order, non-chronological order, and the like. Accordingly, when the password part and one or more non-password parts are provided to the user at a UI output component 208 at step 310, they may be presented randomly, as opposed to an alphabetical order, numerical order, coded-order, chronological order, or some other sequential order of the identifiers. Thus, the password identifier has a non-sequential association with the non-password identifier. For one embodiment, when assigning identifiers at step 308, they should be assigned so that the password identifier and the one or more non-password identifiers do not follow a chronological or alphabetical order. For another embodiment, the password identifier and the one or more non-password identifier may be associated with different types or categories of identifiers. For example, a numerical value may be assigned to one of the identifiers, and a non-numerical value may be assigned to another one of the identifiers. For yet another example, an alphabetical value may be assigned to one of the identifiers, and a non-alphabetical value may be assigned to another one of the identifiers.

After presenting the password and non-password parts to the user, the partitioned password process 300 of the wireless communication device 100 awaits input from the user at one or more UI input component(s) at step 312. FIG. 3 shows an infinite loop for awaiting user input at step 312 when no user input is detected, but it is to be understood that other techniques for detecting user input may be utilized and other operations may occur within, concurrently with, or instead of step 312.

Once user input has been detected at step 312, the partitioned password process 300 determines whether the user input matches the password part, one of the non-passwords, or none of the parts. Where the user input matches the password part, the process 300 then determines whether all parts of the password have been analyzed at step 316. If so, then the process 300 determines that all password parts have been detected at the UI input component(s) and grants access to a secure resource of the resource provider at step 318. In the alternative, the secure resource may be internal to the wireless communication device 100. Where the user input matches the password part but all password parts have not been analyzed, the process 300 then identifies the next part of the password at step 320 and repeats the steps of having the user choose among password and non-password parts and examines the user's choice at steps 306 through 314.

Returning to step 314, if the user input does not match the password part (i.e., a non-password part or none of the parts), then the partitioned password process 300 will not grant access to a secure resource of the resource provider or the wireless communication device 100. For one embodiment, the process 300 may determine whether previous attempts to select the password part have been made, at step 322, for entering the password during this particular session. If the process 300 determines that a previous attempt has occurred (or, in the alternative, a threshold number of attempts have been made), then the process may deny access to the secure resource of the resource provider or the wireless communication device 100 at step 324. For another embodiment, the process 300 may omit step 322 and merely deny access to the secure resource at step 324 upon determining that the user input does not match the password part. For still other embodiments, if the process 300 may allow the user to enter one or more erroneous parts and still gain access to the secure resource. For example, if the process 300 may determines that a previous attempt, or a threshold number of attempts, have been made, then the process may then identify the next part of the password at step 320 and repeat the steps of having the user choose among password and non-password parts and examine the user's choice at steps 306 through 314.

Figure 4:
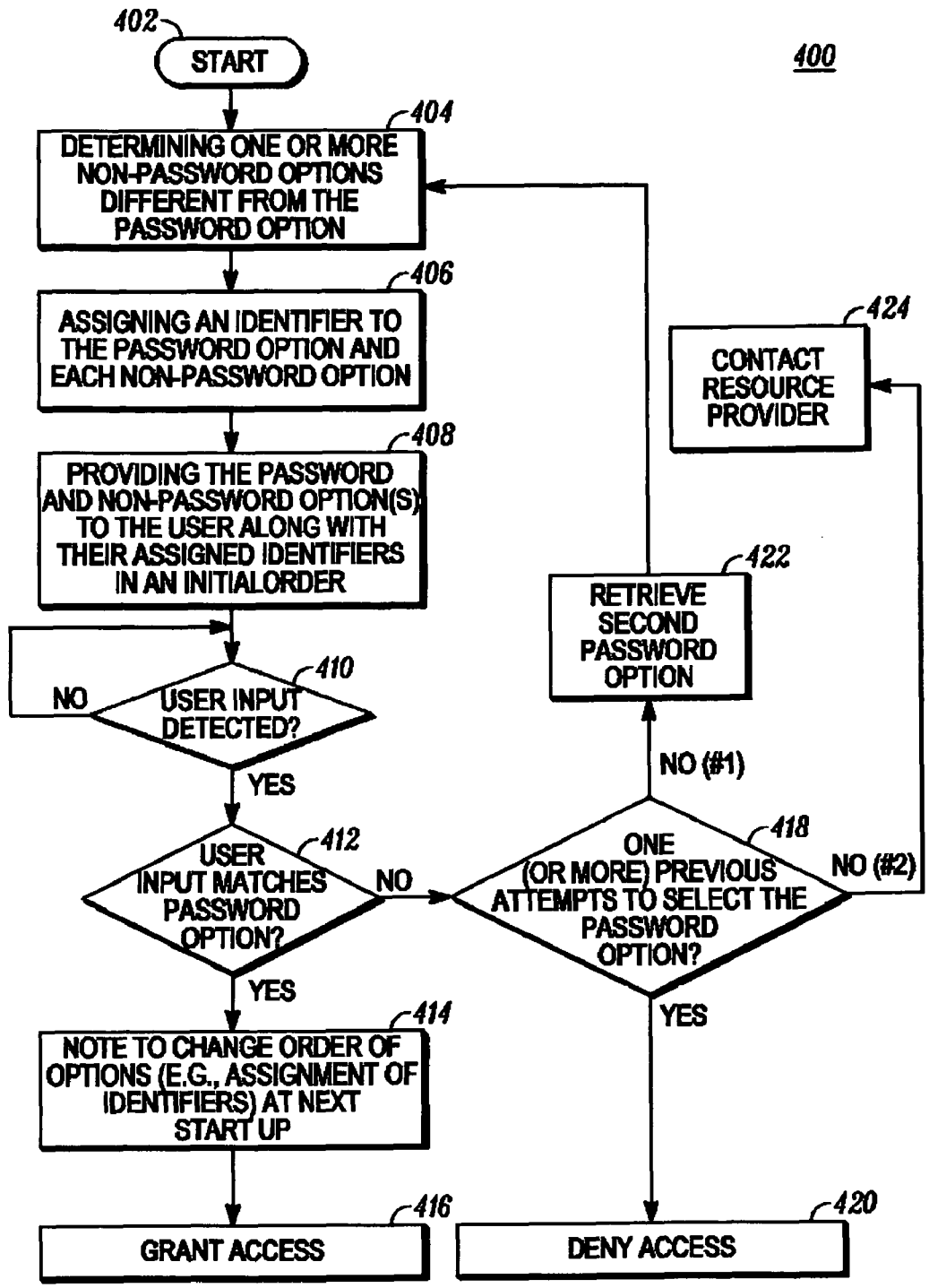
FIG. 4 is a flow diagram representing another exemplary operation of the embodiment of FIG. 1.

Referring to FIG. 4, there is provided a flow diagram representing a session-varying process 400 in accordance with the present invention. Starting at step 402, one or more other options, i.e. at least one non-password option, different from the selected option of the password are determined at step 404. Similar to the non-password options above, the non-password options may be predetermined, generated randomly or generated semi-randomly (based on one or more rules). It is preferable that these non-password options are similar to, but must be different from, the selected password option in format.

For some embodiments, each password option and non-password option may be assigned an identifier at step 406, similar to step 308 above, so that they may be presented based on the alphanumeric order of the identifiers at step 408. For other embodiments, where identifiers are not assigned to the password option and the non-password options, the password and non-password options may be presented based on the alphanumeric order of the options themselves. For still other embodiments, the password and non-password options may be presented in random order, regardless of whether identifiers are assigned.

After presenting the password and non-password options to the user, the session-varying process 400 of the wireless communication device 100 awaits input from the user at one or more UI input component(s) at step 410. Similar to FIG. 3, it is to be understood that various techniques for detecting user input may be utilized in FIG. 4 and other operations may occur within, concurrently with, or instead of step 410.

Once user input has been detected at step 410, the session-varying process 400 determines whether the user input matches the password option, one of the non-passwords, or none of the options. Where the user input matches the password option, the process 400 then notes the order of the password and non-password options at step 414, as presented at step 408. The order of the options is noted so that the process 400 may provide them in a different order during the next session, after the next startup of the process, so that the user will not be presented the options in the same order twice in a row. Also, after the user input matches the password option, the session-varying process 400 grants access to the secure resource of the resource provider at step 416 or the wireless communication device 100.

It should be noted that the order of the options as presented at step 408 may be noted at any time before or after this step, so long as this information is noted once per execution of this step, i.e., once per session, where a specific notation is associated with each occurrence of providing the password and non-password options. It should also be noted that the notation may occur regardless of whether the user input matches the password option or not.

Returning to step 412, if the user input does not match the password option (i.e., a non-password option or none of the options), then the session-varying process 400 will not grant access to a secure resource of the resource provider or the wireless communication device 100. For one embodiment, the process 400 may determine whether previous attempts to select the password option have been made, at step 418, for entering the password during this particular session. If the process 400 determines that a previous attempt has occurred (or, in the alternative, a threshold number of attempts have been made), then the process may deny access to the secure resource of the resource provider or wireless communication device 100 at step 420. For another embodiment, the process 400 may omit step 418 and merely deny access to the secure resource at step 420 upon determining that the user input does not match the password option.

If the session-varying process 400 determines that a previous attempt, or a threshold number of attempts, have been made, then the process may then identify another password option at step 422. For example, the processor 204 of the wireless communication device 100 may retrieve this second password option from the memory portion 206 or receive it from a remote device via transceiver 202. Thereafter, the process 400 may repeat the steps of having the user choose among password and non-password options and examine the user's choice at steps 404 through 412.

In the alternative, upon determining that one or more previous attempts to select the password options have been made, the session-varying process 400 may allow the user to contact the resource provider in order to allow the user to make future attempts to access the secure resource of the resource provider or the wireless communication device 100. Thus, in response to determining that one or more previous attempts to select the password options have been made, the session-varying process 400 may instruct the user to contact the resource provider via one or more UI output components 208, disconnect any existing connection to the resource provider, power down the wireless communication device 100, or otherwise prevent the user from attempting to access the secure resource. In any case, the user may contact the resource provider via the transceiver 202 of the wireless communication device 100 or by some means outside of the device. In response, the resource provider may reactivate the wireless communication device 100 to allow the user to make another attempt at accessing the secure resource by providing a signal or signals to the device via transceiver 202 or provider the user with a code or codes that may be entered at one or more UI input components 210 by the user.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of a wireless communication device for accessing secure resources, the method comprising:
    identifying a partitioned password associated with the wireless communication device;
    assigning a first password identifier to a first password part and a first non-password identifier to a first non-password part different from the first password part, the first password identifier having a non-sequential association with the first non-password identifier;
    providing the first password identifier, the first password part, the first non-password identifier, and the first non-password part at a user interface of the wireless communication device;
    detecting a first user input at the user interface;
    assigning a second password identifier to a second password part and a second non-password identifier to a second non-password part different from the second password part, the second password identifier having a non-sequential association with the second non-password identifier;
    providing the second password identifier, the second password part, the second non-password identifier, and the second non-password part at a user interface of the wireless communication device;
    detecting a second user input at the user interface; and
    granting access to a secure resource in response to determining that the user inputs match the provided first and second password identifiers at the user interface, wherein
    assigning said first and second password identifiers to said first and second password parts and said first and second non-password identifiers to said first and second non-password parts comprises:
    assigning a numerical value or an alphabetical value to one of said first and second password and said first and second non-password identifiers; and
    assigning a non-numerical value or a non-alphabetical value to the other of said first and second password and said first and second non-password identifiers.

2. The method of claim 1, wherein assigning the first and second password identifiers to the first and second password parts and the first and second non-password identifiers to the first and second non-password parts includes determining that the first and second password and the first and second non-password identifiers do not follow a chronological order.

3. The method of claim 1, wherein assigning the first and second password identifiers to the first and second password parts and the first and second non-password identifiers to a non-password includes determining that the first and second password and the first and second non-password identifiers do not follow an alphabetical order.

4. A method of a wireless communication device for accessing secure resources, the method comprising:
    identifying a password associated with the wireless communication device, the password including a first password portion and a second password portion;

assigning a first password identifier to the first password portion and a first non-password identifier to a first non-password portion different from the first password portion, the first password identifier having a non-sequential association with the first non-password identifier;

providing the first password identifier, the first password portion, the first non-password identifier, and the first non-password portion at a user interface of the wireless communication device;

detecting a first user input at the user interface;

assigning a second password identifier to the second password portion and a second non-password identifier to a second non-password portion different from the second password portion, the second password identifier having a non-sequential association with the second non-password identifier;

providing the second password identifier, the second password portion, the second non-password identifier, and the second non-password portion at the user interface;

detecting a second user input at the user interface; and granting access to a secure resource in response to determining that the first and second user inputs match the first and second password identifiers at the user interface, wherein assigning said first and second password identifiers to said first and second password portions and said first and second non-password identifiers to said first and second non-password portions comprises:

assigning a numerical value or an alphabetical value to one of said first and second password and said first and second non-password identifiers; and assigning a non-numerical value or a non-alphabetical value to the other of said first and second password and said first and second non-password identifiers.

5. The method of claim 4, wherein:

assigning the first password identifier to the first password portion and the first non-password identifier to the first non-password portion includes determining that the first password and the first non-password identifiers do not follow a chronological order; and assigning the second password identifier to the second password portion and the second non-password identifier to the second non-password portion includes determining that the second password and the second non-password identifiers do not follow a chronological order.

6. The method of claim 4, wherein:

assigning the first password identifier to the first password portion and the first non-password identifier to the first non-password portion includes determining that the first password and the first non-password identifiers do not follow an alphabetical order; and assigning the second password identifier to the second password portion and the second non-password identifier to the second non-password portion includes determining that the second password and the second non-password identifiers do not follow an alphabetical order.

7. The method of claim 4, further comprising inputting the password at the user interface of the wireless communication device before identifying a password associated with the wireless communication device.

8. The method of claim 4, further comprising generating the first and second non-password portions based on a random portion generator.

9. The method of claim 4, wherein:

providing the first password identifier, the first password portion, the first non-password identifier, and the first non-password portion at a user interface of the wireless communication device includes outputting the first password identifier at an audio output component of the user interface; and providing the second password identifier, the second password portion, the second non-password identifier, and the second non-password portion at the user interface includes outputting the second password identifier at the audio output component of the user interface.

10. The method of claim 4, wherein:

detecting a first user input at the user interface includes detecting audio information received by an audio input component of the user interface; and detecting a second user input at the user interface includes detecting audio information received by the audio input component of the user interface.

11. The method of claim 4, wherein each of the first password identifier, the first non-password identifier, the second password identifier, and the second non-password identifier is a single digit, character or symbol.

12. The method of claim 4, further comprising denying access to the secure resource in response to determining that if either of the provided first and second non-password identifiers does not match the user inputs that have been detected at the user interface.

* * * * *